INVENTORS
JOHN W. AMOSS
GEORGE P. RODRIGUE JR.
BY

ATTORNEY

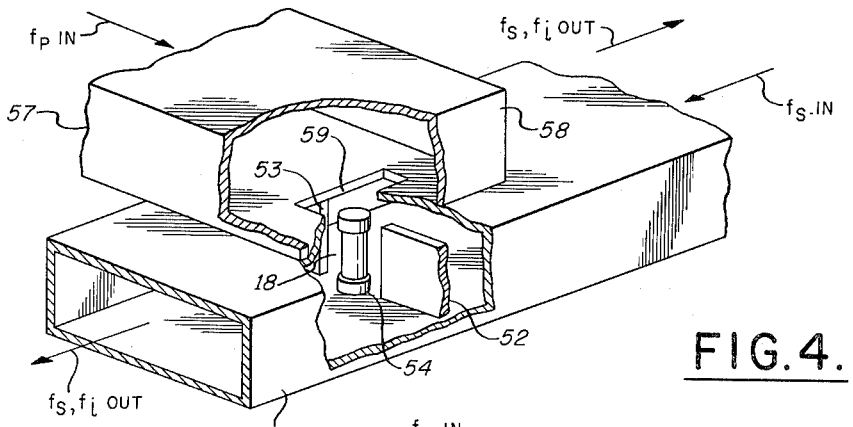
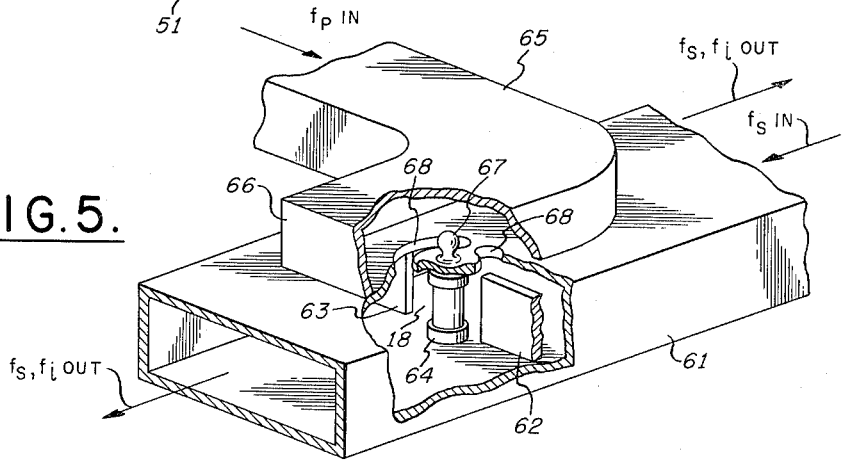
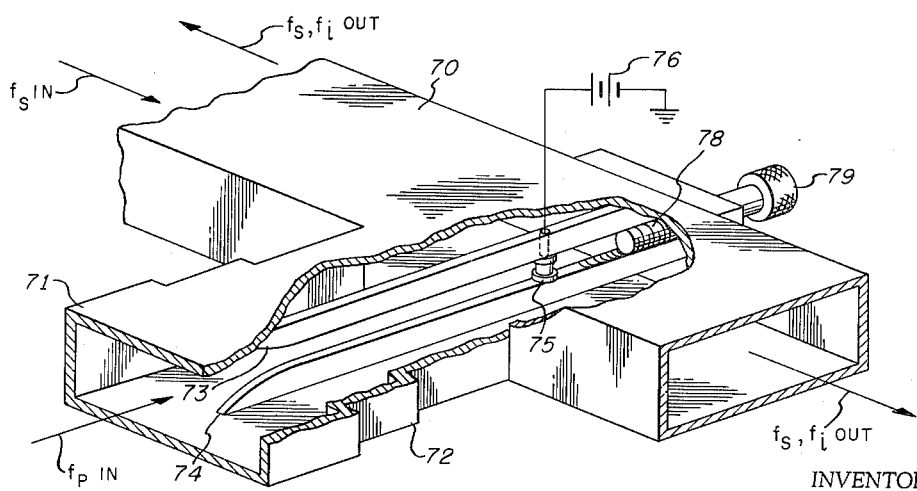

United States Patent Office 3,212,018
Patented Oct. 12, 1965

3,212,018
WAVEGUIDE PARAMETRIC AMPLIFIER EMPLOYING VARIABLE REACTANCE DEVICE AND THIN SEPTA IRIS TO RESONATE FIXED REACTANCE OF THE DEVICE
John W. Amoss, Ozona, and George P. Rodrigue, Jr., Dunedin, Fla., assignors to Sperry Rand Corporation, Great Neck, N.Y., a corporation of Delaware
Filed Dec. 28, 1961, Ser. No. 162,794
4 Claims. (Cl. 330—4.9)

This invention relates to a parametric amplifier for use at microwave frequencies, and more particularly to such an amplifying device that is small and compact, simple and economical to construct and to operate.

Many different types of parametric amplifiers for use at microwave frequencies have been proposed in recent years. Most of those proposed employ variable nonlinear reactance elements in resonant cavities, and usually are rather bulky and complex structures which are relatively difficult and costly to construct.

In one embodiment of the present invention a variable non-linear reactance device is inserted in a non-resonant section of reduced-height rectangular waveguide and a thin inductive septa is provided within the waveguide in a transverse plane that includes the nonlinear reactance device. The nonlinear reactance device has a self-resonant frequency because of its physical characteristics and packaging. When this resonant frequency is higher than the signal frequency to be amplified, the nonlinear reactance device represents a fixed capacitive reactance within the waveguide. The inductive reactance provided by the thin septa is proportioned to resonate with the fixed capacitive reactance of the nonlinear reactance device and thus provide a resonant iris in the transverse plane across the waveguide, thus placing the nonlinear reactance device at a high impedance, and high voltage position within the waveguide. Electromagnetic waves at a signal frequency to be amplified are coupled into one end of the waveguide and couple to the iris from one side, and electromagnetic waves at the pump frequency are coupled to the nonlinear reactance device from the opposite side. The end of the waveguide that propagates the pump frequency waves is proportioned to be cutoff to the signal frequency waves. A circulator is connected to said one end of the waveguide and the apparatus is operated as a one-port degenerate, or a quasi-degenerate amplifier.

The present invention will be explained by referring to the accompanying drawings wherein:

FIGS. 4 and 5 are illustrations of alternative embodiments of the parametric amplifier of the present invention adapted to operate in the transmission mode, and FIG. 6 is a view of an alternative embodiment of the present invention employing a finline transmission line for coupling electromagnetic waves at the pump frequency to the variable reactance device.

Figure 1:
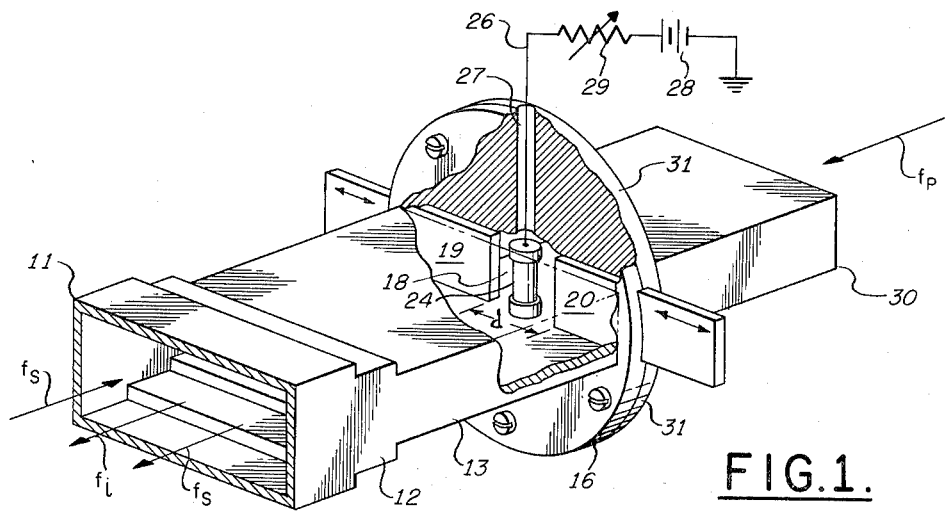
FIG. 1 is a perspective view, partially broken away, illustrating an embodiment of the parametric amplifier of this invention.

Referring now more particularly to FIG. 1, the embodiment of the invention illustrated therein is comprised of a first section of hollow rectangular waveguide 11 that is adapted to freely propagate electromagnetic waves at the signal frequency $f_s$ to be amplified. Waveguide section 11 is coupled through a stepped transition section 12 to a reduced-height waveguide section 13 which also freely propagates electromagnetic waves at the signal frequency $f_s$. Waveguide section 13 is terminated at its right end by a coupling flange 16 which has a thin inductive iris 18 therein. The height of iris 18 is substantially equal to the height of reduced-height waveguide section 13, and its width is determined by the positions of transversely movable speta 19 and 20 of conductive material which form iris 18.

A variable nonlinear reactance element 24 is positioned within iris 18 and extends substantially completely between the broad walls of waveguide section 13. Nonlinear reactance element 24 may be, for example, a semi-conductor diode commonly known as a varactor diode. One such element which has been used with success is the 4254× varactor diode manufactured by Microwave Associates, Inc., Burlington, Mass. Varactor diode 24 is reverse-biased by means of a voltage source 28 coupled through variable resistor 29 and lead 26 to one of its terinals. The top terminal of varactor diode 24 may be electrically insulated from flange 16 by a thin dielectric wafer. The other terminal of varactor diode 24 may be grounded.

A second section of rectangular waveguide 30 is connected by means of coupling flange 31 to the coupling flange 16 and provides means for coupling electromagnetic waves at a pump frequency $f_p$ to the iris 18 and varactor diode 24. Pump frequency $f_p$ is approximately twice the signal frequency $f_s$, and waveguide 30 is dimensioned to freely propagate electromagnetic waves at the pump frequency $f_p$ but is cutoff to the lower frequency electromagnetic waves at the signal frequency $f_s$.

In an embodiment of the invention constructed in the manner illustrated in FIG. 1, the signal frequency was approximately 4.5 kilomegacycles per second and the pump frequency was approximately 9.0 kilomegacycles per second. The device thus constituted a degenerate parametric amplifier that was operated in a reflecting mode, as will be explained more fully below in connection with FIG. 3. The theories of operation of nonlinear reactance devices and of parametric amplifiers now are well understood. For a review of these theories, reference is made to an article by A. Uhlir, Jr. appearing on pages 1099–1115 of the June 1958 Proceedings of the I.R.E.

For efficient operation of a degenerate parametric amplifier at the signal frequency, it is required that the nonlinear reactance element be positioned in a strong electromagnetic field at a region of high impedance. In the past this has been done by placing the nonlinear reactance device in a resonant cavity, but as mentioned above, this often results in a large and bulky structure. In the present invention, the varactor diode 24 is positioned at a region of high impedance and in a strong electric field of the signal frequency electromagnetic waves by placing it in the iris 18 that is resonant at the signal frequency. The physical housing or package of the diode 24 has inductance and capacitance associated therewith, and therefore has a self-resonant frequency. In the embodiment of the invention illustrated in FIG. 1, the self-resonant frequency of the diode was above the signal frequency $f_s$, and therefore presented a capacitive reactance across iris 18. The inductive reactance provided by the thin septa 19 and 20 was proportioned to resonant at the signal frequency $f_s$ with the capacitive reactance of the diode, thus providing the desired resonant iris. The resonant frequency of the iris is, of course, dependent upon the parameters of the particular varactor diode used. The resonant frequency can, however, be varied by either adjusting the iris width (equivalent parallel inductance) by changing the positions of transversely movable septa 19 and 20, and/or by changing the biasing voltage applied to varactor diode 24 (capacitance of the iris). It may be seen that the structure of FIG. 1 is small, compact, and relatively simple to construct.

Circuit theory has shown that the parasitic shunt reactances across the diode must be minimized to obtain a large gain-bandwith product and an optimum noise figure from the parametric amplifier. This, then, requires a low Q circuit. The resonating iris 18 used in this invention exhibits the low Q characteristic because it inherently is not a high Q circuit element and because it largely eliminates parasitic reactances and long line effects. Septa 19 and 20 provide only enough inductive reactance to resonate at the signal frequency with the fixed capacitive reactance presented by the varactor diode 24. The reduced-height waveguide 13 is used so that varactor diode 24 may be mounted directly across the waveguide. This eliminates additional reactance which would have resulted had posts been used to mount the diode across a standard-height waveguide.

Figure 2:
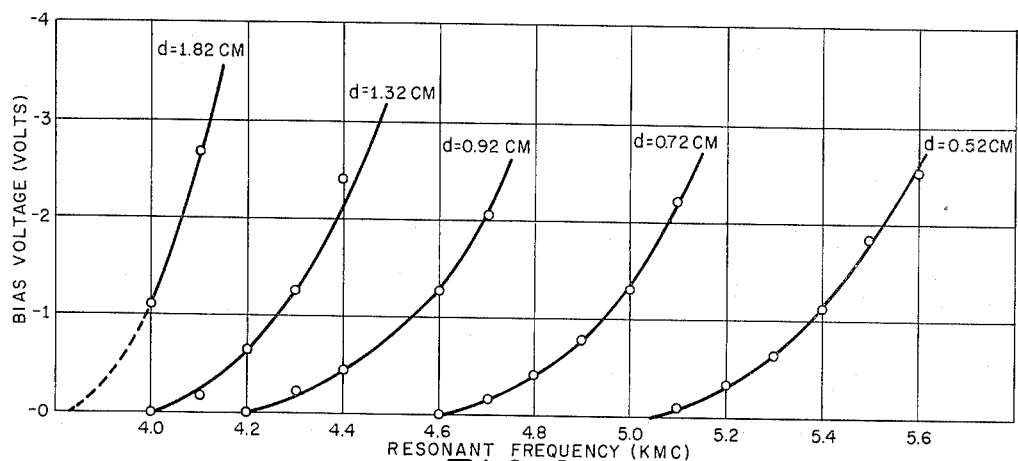
FIG. 2 is a graph showing a series of curves presenting the characteristic of the parametric amplifier of this invention, as a function of varactor diode bias voltage, and as a function of the width of the iris in which said varactor diode is positioned.
Figure 3:
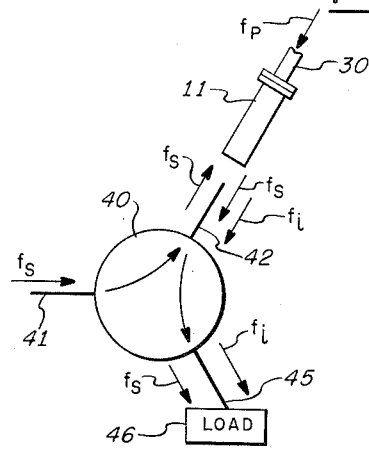
FIG. 3 is a simplified schematic representation of the parametric amplifier of this invention operated with a circulator.

The curves of the graph of FIG. 2 show the change in resonant frequency of the iris as a function of the diode voltage for different iris widths $d$. When operating a device substantially as illustrated in FIG. 1 at a signal frequency of 4.20 kmc., with an iris opening of approximately 1.82 cm., and using the varactor diode previously described, the gain-bandwidth product of the device ($G^{1/2}BW$) was greater than 250 mc. Because the parametric amplifier of the embodiment of the invention illustrated in FIG. 1 operates in a reflecting mode, optimum utilization and efficiency are obtained from the device by the use of a circulator 40 as illustrated in FIG. 3. Circulator 40 may be a y-junction circulator of a type now well known in the art. In the operation of the degenerate parametric amplifier of this invention, electromagnetic waves at the signal frequency $f_s$ are coupled into terminal 41 of circulator 40 and are coupled substantially exclusively to terminal 42 and thence into waveguide section 11. These electromagnetic waves at the signal frequency $f_s$, together with electromagnetic waves at the pump frequency $f_p$ from waveguide section 30 are incident upon the resonant iris 18. Varactor diode 24 then operates in its known manner to produce amplified signals at the signal frequency $f_s$ along with electromagnetic waves at an idler frequency $f_i$ which is the difference between the pump frequency $f_p$ and signal frequency $f_s$.

In addition to operating as a degenerate amplifier, the device of this invention may be operated in a quasi-degenerate mode in which the signal frequency is not exactly one-half the pump frequency. Because the idler frequency $f_i$ is equal to the difference between the pump frequency and the signal frequency, the idler frequency will differ by a frequency $\Delta f$ from the signal frequency when the amplifier is operated in the quasi-degenerate mode. When operating in the quasi-degenerate mode in the arrangement illustrated in FIG. 3, and wherein the load 46 is a receiver, the frequency selective characteristics of the I-F amplifier of the receiver may be relied upon to reject the idler frequency $f_i$ which is chosen to fall outside of the band-pass frequency range of the receiver. In the claims below it is stated that the pump frequency is "approximately" twice the signal frequency. This is intended to be descriptive of both the degenerate and quasi-degenerate modes of operation.

Furthermore, with high pump frequency power levels incident on varactor diode 24, the amplifier can be made to oscillate at one-half the pump frequency. This affords the possibility of utilizing the device of FIG. 1 in both the transmit and receive modes of operation in a radar or communications system. For example, during the transmit portion of the operating cycle of the equipment, the pump frequency power would be increased to a high level to cause the device to oscillate at the signal frequency, this being a subharmonic of the pump frequency in a degenerate parametric amplifier, and through suitable duplexing arrangements, this oscillatory energy may be coupled to an antenna and radiated. During the received portion of the operating cycle, the pump frequency power would be decreased, the oscillations would cease, and the device would be in an amplifying state for received signals coupled to waveguide section 11. This dual mode of operation also could be achieved by an appropriate programming of the bias voltage applied to varactor diode 24.

An alternative embodiment of the preset invention adapted for operation in the transmission mode is illustrated in FIG. 4 and is comprised of a section of rectangular waveguide 51 that is adapted to propagate electromagnetic waves at the signal frequency $f_s$. Thin conductive septa 52 and 53 extend transversely across the waveguide to provide the inductive iris 18. Varactor diode 54 is positioned between the broad walls of waveguide 51 within the iris 18. As in the embodiment of FIG. 1, the fixed capacitance of varactor diode 54 and the inductive reactance of the thin septa 52 and 53 are proportioned to resonant at the signal frequency $f_s$. A second section of rectangular waveguide 57 is disposed on the top wall of waveguide section 51 and extends transversely therefrom. A coupling aperture 59 extending transversely through the bottom wall of waveguide 57 and longitudinally through the top wall of waveguide 51 provides means for coupling electromagnetic waves at the pump frequency $f_p$ from waveguide 57 into the resonant iris 18 in waveguide 51. Waveguide 57 is short circuited at its right end by means of conductive wall 58. Coupling aperture 59 is positioned substantially an integral number of half waveguide wavelengths at the pump frequency from the shorted end 58 of waveguide 57. Because of its orientation with respect to the two waveguides 51 and 57, coupling aperture 59 serves to couple the pump frequency waves from waveguide 57 into waveguide 51, but has negligible effect to couple signal frequency waves from waveguide 51 to waveguide 57. To further prevent signal frequency waves from coupling into waveguide section 51, said waveguide section may be dimensioned to be cutoff to the signal frequency waves.

In the operation of the parametric amplifier of FIG. 4, signal frequency waves are coupled into waveguide section 51 at its far end and are incident upon varactor diode 54 in resonant iris 18. Pump frequency waves are coupled into the left end of waveguide section 57, are coupled through coupling aperture 59 into resonant iris 18 to cause the non-linear capacitance of varactor diode 54 to vary as a function of said pump frequency waves. Varactor diode 54 then operates in accordance with known principles to amplify the signal frequency waves which then propagate to both ends of waveguide section 51. A utilization device may be coupled to the left end of waveguide section 51.

Another embodiment of the parametric amplifier of this invention operating in a transmission mode is illustrated in FIG. 5 wherein rectangular waveguide section 61 is adapted to propagate electromagnetic waves at the signal frequency $f_s$. Disopsed within waveguide section 61 are transversely extending thin conductive septa 62 and 63 which form iris 18. Varactor diode 64 is positioned within iris 18 and the fixed capacitance of varactor diode 64 and the inductive reactance of iris 18 are proportioned to resonant at the signal frequency $f_s$. A second rectangular waveguide 65 is adapted to propagate electromagnetic waves at the pump frequency $f_p$ and shares a common broad wall with waveguide section 61 over at least a portion of their lengths. Pump frequency waves are coupled from waveguide 65 into waveguide 61 by means of an E-field probe 67 and a resonant ring aperture 68. Resonant ring aperture 68 is dimensioned to be parallel resonant for pump frequency waves and thus couples said pump frequency waves to varactor diode 64 in resonant iris 18. Resonant ring aperture 68 acts as a short-circuit to signal frequency waves propagating in waveguide 61. The left end of waveguide section 67 is terminated by a conductive short circuit 66 that is positioned an odd multiple of quarter waveguide wavelengths from E-field probe 67. The operation of the device illustrated in FIG. 5 is generally similar to the operation of the device illustrated in FIG. 4 and will not be explained further.

In both of the devices illustrated in FIGS. 4 and 5, coaxial transmission lines may be employed to couple pump frequency waves into the resonant iris 18. Both of the embodiments of FIGS. 4 and 5 are well suited for use with radiating horns coupled to one end of the respective waveguides 51 and 61. In this type of arrangement, varactor diodes 54 and 64 can be made to oscillate during a transmission portion of an operating cycle by increasing the power level of the pump frequency waves or by decreasing the bias voltage applied to the varactor diode, and may be operated in an amplifying mode during a received portion of the operating cycle by reducing the pump power coupled to the varactor diodes or by increasing the bias voltage applied to the diode. Known matching and duplexing techniques will be employed to accomplish this dual-mode type of operation.

Both the devices of FIG. 4 and FIG. 5 can be operated in a reflection mode by short circuiting the left ends of waveguides 51 and 61 at appropriate distances from the resonant irises 18 and by connecting the right ends of said waveguides to circulators in a manner illustrated in FIG. 3.

An alternative embodiment of the present invention is illustrated in FIG. 6 and is comprised of a section of rectangular waveguide 70 adapted to propagate electromagnetic waves at the signal frequency $f_s$ to be amplified. A second section of rectangular waveguide 71 is coupled to a narrow wall of waveguide section 70 through a stepped transition section 72. Waveguide section 71 is dimensioned to freely propagate electromagnetic waves at the pump frequency $f_p$, but is cutoff to electromagnetic waves at the signal frequency $F_s$. Two narrow conductive fins 73 and 74 are secured to the top and bottom walls of waveguides 70 and 71 and extend transversely across waveguide 70 and terminate at tapered ends within waveguide section 71. Fins 73 and 74 form a finline transmission line and waves at the pump frequency $f_p$ propagate substantially exclusively between the fins from waveguide section 71 into waveguide section 70. Within waveguide 70, fins 73 and 74 serve the additional role of transverse septa forming a capacitive iris that presents a simple shunting reactance within waveguide 70. A nonlinear variable reactance device 75, a varactor diode for example, is positioned between the fins 73 and 74 substantially midway between the narrow walls of waveguide section 70. Varactor diode 75 is biased by a voltage source 76 by means of a lead that extends through the top fin 73. Suitable insulating means, such as a thin dielectric wafer, may be used to electrically isolate varactor diode 75 from the top fin 73. An inductive tuning member 78 extends transversely between fins 37 and 74.

Inductive tuning member 78 is threadably engaged with fins 73 and 74 and the extent of its penetration between said fins may be adjusted by means of external knob 79 to tune the iris formed by fins 73 and 74, diode 75 and inductive member 78. The fixed reactance presented by diode 75, the reactance presented by fins 73 and 74, and the inductance presented by tuning member 78 are proportioned to resonate at the signal frequency $f_s$. In this embodiment of the invention, the fixed reactance presented by varactor diode 75 may be inductive at the signal frequency $f_s$.

The operation of the device illustrated in FIG. 6 is similar to the operation of the device illustrated in FIG. 4. Electromagnetic waves at the signal frequency $f_s$ may be coupled into the left end of waveguide section 70, and electromagnetic waves at the pump frequency $f_p$ may be coupled into waveguide section 71 and onto the finline transmission line comprised of fins 73 and 74. The waves at these two frequencies are incident on varactor diode 75 positioned within the resonant iris, and said diode operates in its known manner to amplify the waves at the signal frequency $f_s$. These waves, together with waves at the idler frequency $f_i$ then propagate from either end of waveguide section 70.

If desired, a utilization device such as a radiating horn may be coupled to the right end of waveguide section 70, or alternatively, the right end of waveguide section 70 may be short circuited at an appropriate distance from the resonant iris and the device may be operated in conjunction with a circulator in a reflection mode of operation.

The device of FIG. 6 may be operated as a degenerate parametric amplifier or as a quasi-degenerate amplifier. Additionally, the device of FIG. 6 may be operated as an oscillator in the same manner as the devices previously described. Further, the device of FIG. 6 may be operated in a dual mode to oscillate during a transmitting portion of an operating cycle and as an amplifier during a receiving portion of an operating cycle, substantially as described earlier with regard to the previously described embodiments of this invention.

While this invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. Electromagnetic wave apparatus comprising,
   a signal frequency waveguide structure for propagating electromagnetic waves at a signal frequency in a mode having a transverse electric field component,
   a variable nonlinear reactance means disposed within said waveguide parallel to said electric field component and responsive to an electric field component of a pump frequency signal at a frequency approximately twice said signal frequency to vary its reactance as a function of the field strength of the pump frequency signal,
       said variable nonlinear reactance means also introducing into said signal frequency waveguide structure a reactance that does not vary as a function of the field strength of the pump frequency signal,
   thin septa reactance means disposed in said signal frequency waveguide in a common transverse plane with said variable nonlinear reactance means for presenting in said plane a value of reactance that is proportioned to resonate with said non-varying reactance at a frequency approximately equal to said signal frequency, and
   means for coupling a source of pump frequency signals to said nonlinear reactance means to vary its nonlinear reactance as a function of said pump frequency signal.
2. Electromagnetic wave apparatus comprising,
   a signal frequency waveguide structure for propagating electromagnetic waves at a signal frequency in a mode having a transverse electric field component,
   a variable nonlinear reactance means extending across said signal frequency waveguide within and parallel to said electric field component and responsive to an electric field component of a pump frequency signal at a frequency approximately twice said signal frequency to vary its reactance as a function of the field strength of the pump frequency signal, said variable nonlinear reactance means also introducing into said signal frequency waveguide structure a capacitive reactance that does not vary as a function of the field strength of the pump frequency signal, an inductive iris disposed in said signal frequency waveguide in a common transverse plane with said variable nonlinear reactance means and presenting in said plane a value of inductive reactance that is proportioned to resonate with said non-varying capacitive resistance at a frequency approximately equal to said signal frequency, and means for coupling a source of pump frequency signals to said iris for varying the reactance of said variable reactance means as a function of said pump frequency signal.

3. A degenerate parametric amplifier for amplifying electromagnetic waves at a first frequency comprising, a first section of rectangular waveguide having broad and narrow walls for propagating electromagnetic waves at a first frequency in a mode having a transverse electric field component parallel to said narrow walls, means at one end of said first waveguide section for coupling waves at said first frequency into said waveguide, a second section of rectangular waveguide having broad and narrow walls for propagating electromagnetic waves in a transverse electric field mode at a pump frequency approximately twice said first frequency,
    said second section of rectangular waveguide being beyond cut off to said first frequency waves, means at one end of said second waveguide section for coupling pump frequency waves to said second waveguide,
    said two sections of waveguide being collinear and abutting at their respective other ends at a common transverse plane, a semiconductor diode having a variable nonlinear reactance characteristic positioned in said transverse plane in the central regions of the respective electric fields of said waveguides and responsive to said pump frequency waves to vary its reactance as a function of the strength of the pump frequency electric field,
    said diode also having associated with it a capacitive reactance that is substantially constant at a given frequency, means positioned in said common transverse plane for presenting an inductive reactance to substantially resonate with said constant capacitive reactance at said first frequency, thereby to substantially cancel said constant capacitive reactance at said plane for waves at said first frequency,
    said means for presenting an inductive reactance comprising,
        an inductive iris extending entirely between the broad walls of said two waveguides on on the transverse sides of said diode.

4. A degenerate parametric amplifier for amplifying signal electromagnetic waves at a first frequency, said amplifier comprising, a section of rectangular waveguide having broad and narrow walls for propagating signal electromagnetic waves at a first frequency in a mode having a transverse electric field component parallel to said narrow walls, a semiconductor diode disposed within said waveguide parallel to said electric field,
    said diode being encapsulated by a housing that extends completely between the broad walls of said waveguide,
    said diode having a variable nonlinear reactance characteristic and being responsive to a pump signal at a frequency approximately twice said first frequency to vary its nonlinear reactance as a function of the strength of the pump signal electric field,
    said diode also having associated with it a capacitive reactance that is substantially constant at a given frequency, first and second thin conductive septa disposed within said waveguide in a common transverse plane with and on opposite sides of said diode,
    said two septa being the full height of the waveguide section and being in conductive contact with the respective narrow walls thereof to form an inductive iris in said plane,
    said septa being positioned in said waveguide to present in said plane with said diode a value of inductive reactance that is proportioned to substantially resonate at said first frequency with said constant capacitive reactance associated with said diode, means at one end of said waveguide section for coupling therefrom signal waves at said first frequency, and means at the opposite end of said waveguide section for coupling pump frequency waves to said diode.

References Cited by the Examiner

UNITED STATES PATENTS

| 3,040,267 | 6/62 | Seidel | 330—4.9 |
| 3,050,689 | 8/62 | De Loach | 330—4.9 |
| 3,071,729 | 1/63 | Schiffman | 330—4.9 |

FOREIGN PATENTS

| 1,114,857 | 10/61 | Germany. |

OTHER REFERENCES

Solomon et al.: "Proceedings of the IRE," July 1960, pages 1322–1323.

Troetschel et al.: "QST," January 1961, pages 13–19.

ROY LAKE, *Primary Examiner.*

ARTHUR GAUSS, *Examiner.*